United States Patent [19]

McBride

[11] 4,375,068
[45] Feb. 22, 1983

[54] RADIOGRAPHIC APPARATUS AND METHOD WITH LOGARITHMIC VIDEO COMPRESSION

[75] Inventor: Thomas R. McBride, Newbury, Ohio

[73] Assignee: Technicare Corporation, Solon, Ohio

[21] Appl. No.: 142,499

[22] Filed: Apr. 21, 1980

[51] Int. Cl.³ .............................................. H04N 7/18
[52] U.S. Cl. ..................................... 358/111; 358/96; 378/99
[58] Field of Search ............................... 358/111, 96; 250/416 TV; 364/414

[56] References Cited

U.S. PATENT DOCUMENTS

| | | | |
|---|---|---|---|
| 3,573,461 | 4/1971 | Ohlsson | 250/95 |
| 3,582,651 | 6/1971 | Siedband | 250/93 |
| 3,784,816 | 1/1974 | Abrahamsson | 250/273 |
| 3,848,130 | 11/1974 | Macovski | 250/369 |
| 4,013,833 | 3/1977 | Zimmerman | 358/111 |
| 4,101,961 | 7/1978 | Reiber | 358/96 |
| 4,204,225 | 5/1980 | Mistretta | 358/111 |
| 4,229,764 | 10/1980 | Danos | 358/111 |

OTHER PUBLICATIONS

Texas Instruments Catalog, Jun. 1976, pp. 323–329.

Primary Examiner—Howard Britton

[57] ABSTRACT

A source of radiation irradiates an area of interest of a patient. An image intensifier receives the x-rays which have traversed the patient and provides an optical image of an x-ray shadowgraph through the examined area of the patient. A television camera converts the optical image into a video signal. A signal processor operates on the video signal by adding an offset signal to the gray scale signal and by logarithmically compressing the gray scale portion of the video signal. An automatic zero circuit is provided which readjusts the offset signal between each horizontal sweep of the television camera. The logarithmically compressed gray scale portion of the video signal and the synchronization portion are received by an image processor. The image processor digitally stores a mask image or shadowgraph of the patient before being injected with an x-ray opaque contrast agent. The image processor also stores in a post contrast image or shadowgraph of the same area of the patient after the patient has been injected with an x-ray opaque contrast agent. The image processor subtractively combines the mask image with the post contrast image to produce a difference image. A video monitor displays the difference image.

13 Claims, 4 Drawing Figures

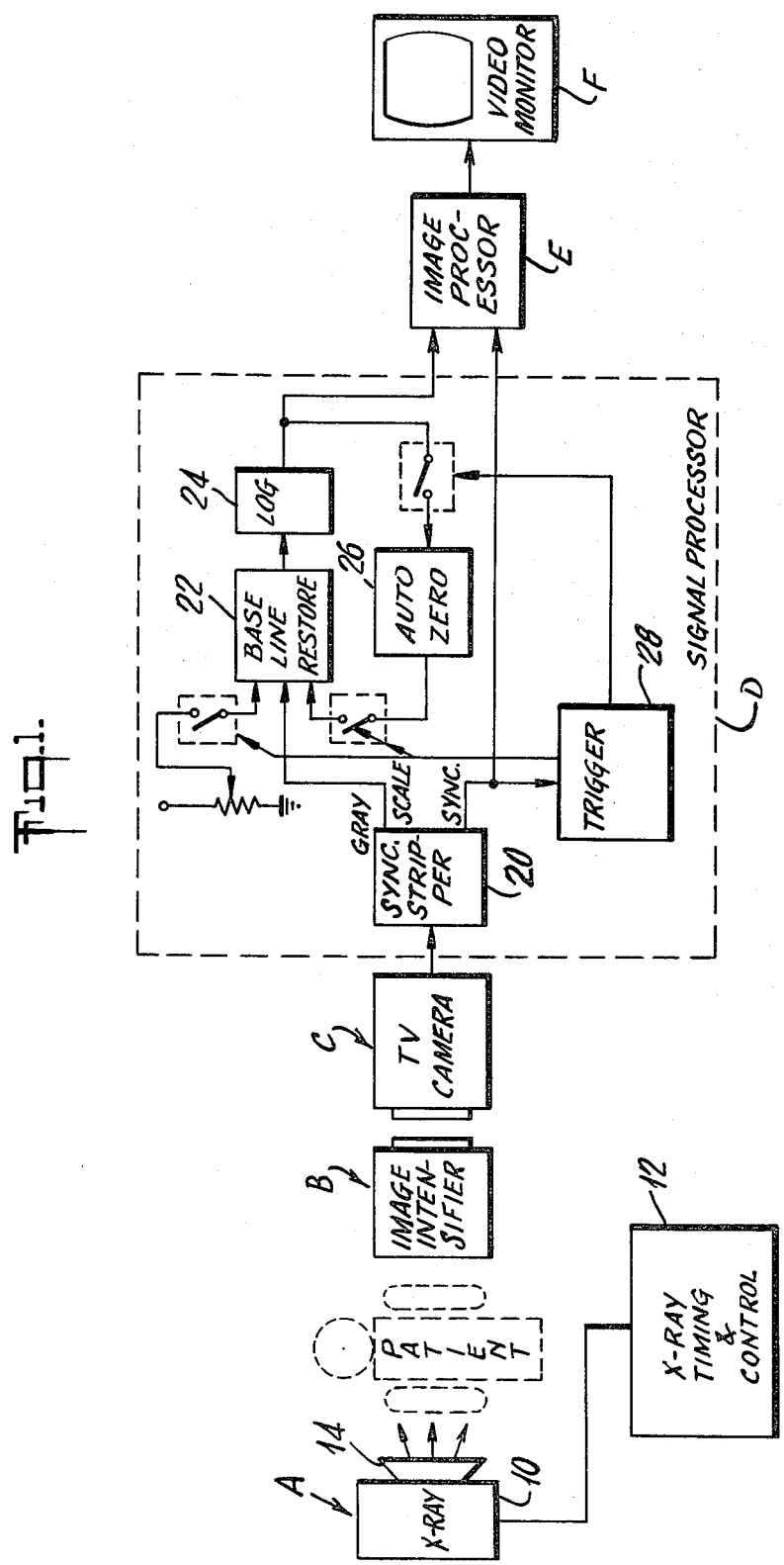

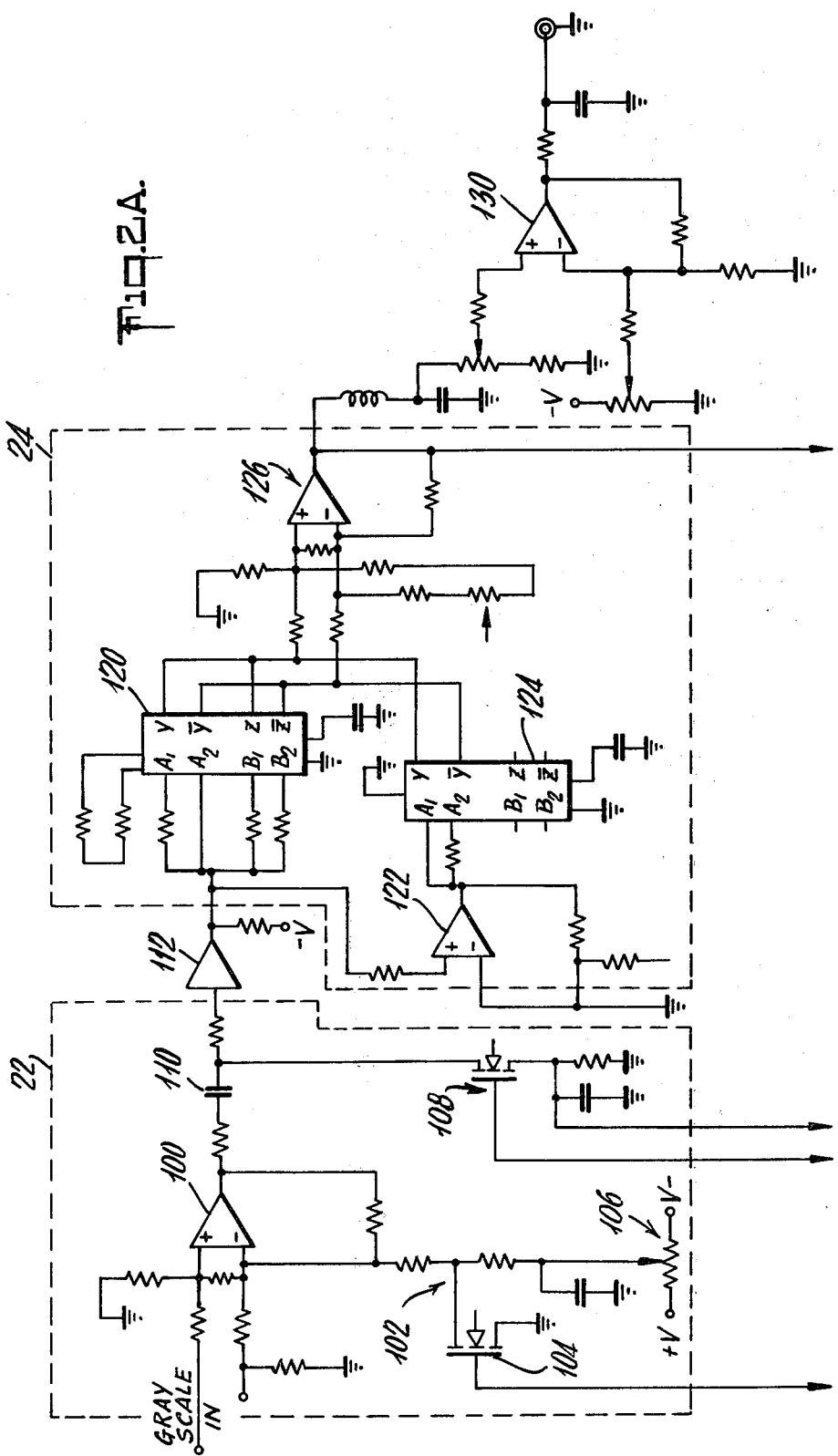

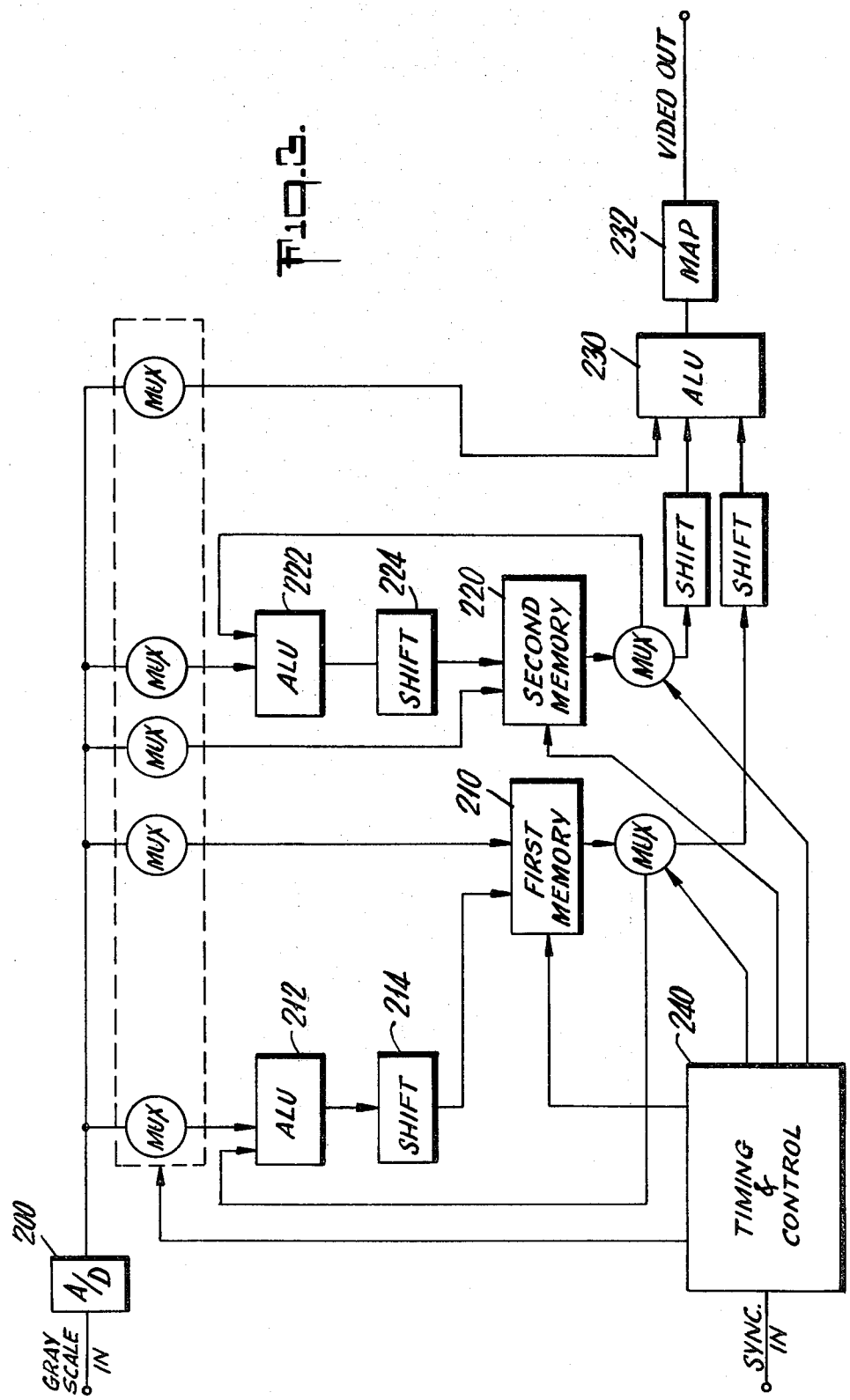

RADIOGRAPHIC APPARATUS AND METHOD WITH LOGARITHMIC VIDEO COMPRESSION

BACKGROUND OF THE INVENTION

This invention pertains to the radiographic diagnostic arts and more particularly to a radiographic apparatus and method for dynamic enhancement of video image signals. The invention is particularly applicable to radiographic apparatus which produce a two dimensional shadowgraph of a three dimensional area of interest through the patient and which display the shadowgraph as video images.

Radiographic apparatus are known in which a patient is subjected to radiation from an x-ray source. The radiation which has traversed the patient is received on a fluoroscopic screen or the like for converting the radiation into an optical image whose intensity corresponds to the intensity of the received x-radiation. By placing photographic film adjacent the screen, a photograph of the image is produced.

Others have disposed a television camera to convert the optical image into a video signal, note for example U.S. Pat. Nos. 3,573,461 which issued Apr. 6, 1971 to S. A. Ohlsson, 3,582,651 which issued June 1, 1971 to M. P. Siedband, 3,784,816 which issued Jan. 8, 1974 to A. S. Abrahamsson and 3,848,130 which issued Nov. 12, 1974 to A. Macovski. The video signals from the camera are operated on by various signal and image processing means. The processing may include various additive and subtractive operations on the video signal.

The intensity of radiation transmitted through an object is an exponential function of the thickness and density of the object. That is, the intensity of radiation is attenuated as a function of the thickness and density of each subregion of the object traversed by the radiation. With respect to density of elements or subregions of the object, the subtractive and additive operations performed on the gray scale portion of the signal are nonlinear operations. This nonlinearity causes distortions in the processed image.

For medical diagnostic purposes, small changes in the level of the gray scale may be very significant. Television cameras, however, tend to lack stability in their gray scale amplitudes. That is, the reference (black or zero) intensity level of the gray scale tends to fluctuate while the camera is being operated. This causes errors and fluctuations in the gray scale of various parts of the video signal.

SUMMARY OF THE INVENTION

I have discovered a new and improved radiographic apparatus and method which overcomes the above referenced problems.

In accordance with the present invention, there is provided a radiographic apparatus which operates on a video signal with a logarithmic transfer function.

There is further provided a radiographic apparatus which periodically adjusts the reference level of the gray scale of a video signal during each frame produced by a television camera.

A principle advantage of the invention is that it maintains constant changes in the gray scale level for a constant object regardless of its thickness and density. A second advantage of the present invention is that it logarithmically compresses the gray scale range of video signals to allow a wider range of transmission intensities in the viewed image. Another advantage of the present invention is that with respect to the density of the examined object, addition and subtraction operations on the gray scale of the video signal are substantially linear operations. A further advantage of the present invention is that it corrects for drift in the reference level of the gray scale of the television camera during each frame.

BRIEF DESCRIPTION OF THE FIGURES

FIG. 1 is a schematic diagram of a radiographic apparatus in accordance with the present invention;

FIGS. 2A and 2B taken together are a detailed schematic diagram of the signal processor of FIG. 1; and FIG. 3 is a schematic diagram of the image processor of FIG. 1.

DESCRIPTION OF THE PREFERRED EMBODIMENTS

Figure 2B:
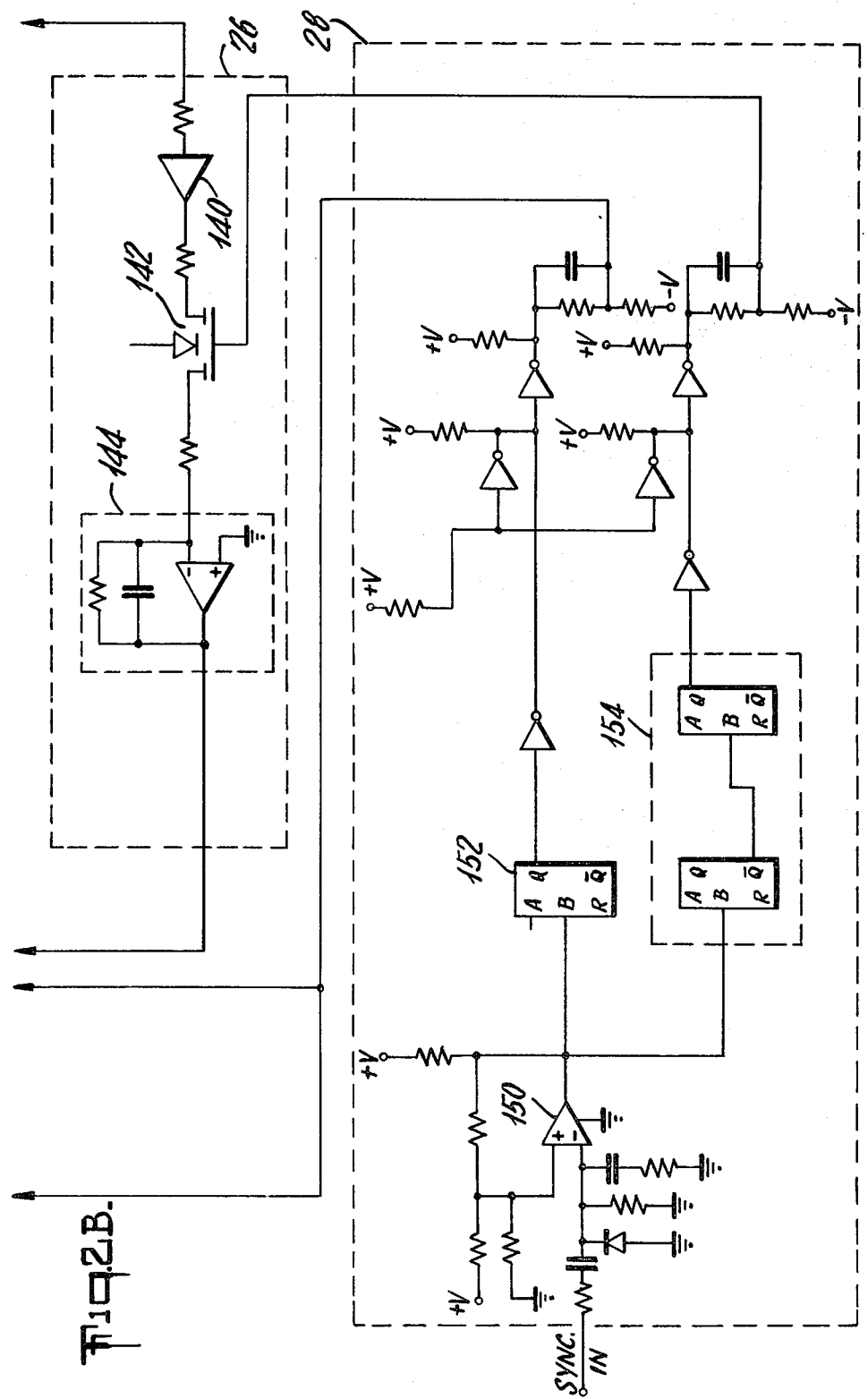

With reference to FIG. 1, a penetrating radiation source A is disposed for irradiating an area or region to be examined in a patient or other object. An image intensifier B or other radiation converting means for converting the x-radiation into an optical image is disposed opposite the patient from the penetrating radiation source. The optical image represents a two dimensional projection or shadowgraph of the three dimension object with respect to x-ray transmission. Subregions of the object along the third dimension are superimposed. Optically coupled with the image intensifier B is a television camera C for converting the optical image into video signals. A signal processor D is provided for improving the quality of the video signal. An image processor E receives video signals from the television camera C and signal processor D to produce a plurality of electronic representations of a plurality of the shadowgraphic images viewed by the television camera C on the image intensifier B. The image processor E further operates on the electronic representations of the optical images such as by adding, subtracting, or performing other modifications of the images. A video monitor F is connected with the image processor E for displaying the processed images.

The penetrating radiation source A comprises an x-ray tube 10 for generating the x-radiation and a timing and control means or circuit 12 for controlling the x-ray tube 10. Because x-radiation is the principle type of radiation used in this manner, the penetrating radiation source is herein referenced as an x-ray source. However, it will be appreciated that other forms of radiation, such as gamma radiation, are contemplated by this invention. The timing and control circuit 12 provides the proper electrical power and operating conditions to select the KV operating perameters of the tube, the milliamperes (Ma) supplied to drive the x-ray tube, and the duration for which the x-ray source is actuated to emit x-radiation. An adjustable collimator 14 is provided for shaping the emitted x-radiation from the x-ray tube 10.

A means for converting the x or other penetrating radiation into a video signal is embodied in the image intensifier B taken with the television camera C. Other devices such as charge coupled devices (CCD) and other direct or multistep conversion devices are contemplated by this invention. Conventionally, image intensifiers include a screen of a first material which releases electrons upon being subject to x-radiation. An electron accelerator is provided for accelerating the electrons from the x-ray sensitive screen to a fluoroscopic or phosphorescent screen. Upon being struck by the electrons, the fluoroscopic screen produces a visual image. The intensity of light in the optical image corresponds to the intensity of radiation striking the x-ray sensitive screen. The television camera C is a conventional television camera or vidicon with a lead oxide (PbO) target and the appropriate lens for focusing the image of the image intensifier on the target.

The signal processor D includes a synchronization signal stripper or other circuit for dividing the gray scale portion of the video signal from the synchronization portion. The gray scale portion indicates the amplitude of light intensity along the horizontal sweep lines in each video frame. The synchronization portion indicates the divisions between horizontal sweep lines, the divisions between frames, and the like. The gray scale portion of the video signal is received by a base line restorer 22 which combines the gray scale signal with an offset signal or d.c. voltage. From the base line restorer 22, the gray scale portion of the video signal is received by a circuit or means 24 for performing a logarithmic transfer function. The logarithmic transfer circuit 24 logarithmically compresses the gray scale by altering the amplitude of each gray scale value logarithmically. Because the amplitude of the video signal is adjusted with offset voltages and the like to be within the normal operating ranges of circuit components of the signal processor, image processor, and video monitor, it is not necessary for the logarithmic transfer circuit to produce the precise mathematical logarithm of the received value. Rather the logarithmic transfer circuit produces an output which varies with logarithmic conformity to variations in its input. An automatic zero circuit 26 provides the offset signal which is combined with the gray scale signal by the base line restorer 22. The automatic zero circuit 26 determines the amplitude of the offset signal from the output of logarithmic transfer circuit 24 during a part of the retrace period between horizontal sweeps of the television camera C.

The synchronization portion of the video signal is conveyed to a trigger and timing circuit or means 28. The trigger circuit 28 receives the synchronization pulse which marks the end of each horizontal sweep in the video signal. After the synchronization pulse is received, there is a horizontal retrace period interposed before the next horizontal sweep line. During the retrace period, the gray scale level of the retrace portion of the video signal should be zero or some other reference level. During the retrace period, trigger circuit 28 causes the automatic zero circuit 26 to monitor the output of the logarithmic transfer circuit 24 to determine the offset signal which must be combined with the gray scale portion of the video signal by the base line restorer 22 to reference the output of the logarithmic transfer circuit to the reference level. At the end of the retrace period, the trigger circuit 28 disconnects the automatic zero circuit 26 from the output of the logarithmic transfer circuit 24. The automatic zero circuit causes the appropriate offset signal to be added to the gray scale portion during the next sweep. In this manner, the signal processor combines with the gray scale signal an offset signal which is readjusted during each retrace period and logarithmically compresses the gray scale portion of the video signal.

With reference to FIGS. 2A and B, further details of signal processor D are shown. The gray scale portion of the signal is received in the base line restorer 22 by a buffer amplifier 100, e.g. NE5539. A circuit 102 is provided for adding an offset voltage to an input of buffer amplifier 100. Circuit 102 includes an FET switch 104, e.g. SD5000, for selecting between a manually calibrated offset voltage from variable resistor 106 and ground. The base line restorer 22 also includes a means 108 for adding the offset signal from the automatic correction circuit 26 to the output of the buffer amplifier 100. Specifically, during the retrace period the offset signal which is received from the automatic zero circuit is stored on a capacitor 110 as an analog voltage. During the horizontal sweep period, the gray scale portion from buffer amplifier 100 is boosted by the voltage stored on capacitor 110. Connected with the output of the baseline restorer 22 is a buffer amplifier 112, e.g. LM310.

The logarithmic transfer circuit 24 receives the analog gray scale signal from buffer amplifier 112. The analog signal is divided with a series of resistors and supplied to four inputs of a logarithmic amplifier 120, e.g. TL441, to be logarithmically amplified along four parallel stages or paths at seven and one half decibel intervals. Logarithmic amplifier 120 converts analog signals received at each of its four stages into an analog signal which varies in conformity with the logarithm of the received input. An amplifier 122, e.g. NE5539, amplifies the received analog signal by thirty decibels and applies the amplified signal to two stages of a second logarithmic amplifier 124, e.g. TL441. The signal is divided by resistors and supplied to two inputs of logarithmic amplifier 124 at seven and one half decibel intervals. By amplifying the gray scale signal by thirty decibels, amplifier 122 amplifies the small gray scale signals into the amplitude range which falls in the range of the logarithmic amplifier 124. In this way, low amplitude gray scale signals are converted accurately into their logarithms. An amplifier 126, e.g. NE5539, functions as a summing means to sum the six logarithmic signals produced by the first and second logarithmic amplifiers 120 and 124 into a single logarithmically compressed gray scale signal. An output amplifier 130, e.g. NE5539, amplifies the logarithmically compressed gray scale portion of the video signal. Amplifier 130 provides the gray scale output for connection with image processor E.

The automatic zero circuit 26 includes a buffer amplifier 140, e.g. LM310, which receives the logarithmically compressed gray scale output from summing amplifier 126. An FET switch 142, e.g. SD5000, connects the output of buffer amplifier 140 to an integrator 144. When the FET switch 142 is closed, integrator 144 integrates the signal received from buffer amplifier 140 and provides the sum of the integration as its output. The integrator 140 may comprise an LF356 operational amplifier in parallel with a 1 microfarad capacitor and a 10 megohm resistor. The integration time is chosen to be long compared to the duration of the retrace period. The output of the integrator 144 is connected to the switching means 108 and base line restorer 22. The sum of the integration is the offset signal which is stored in the capacitor 110 to be combined with the gray scale portion of the video signal.

The trigger circuit 28 receives the synchronization pulses and amplifies them with an amplifier 150, e.g. LM311. The amplifier 150 is connected with a first one shot 152, e.g. 74LS221, which produces a pulse of predetermined amplitude and duration in response to each synchronization pulse. Amplifier 150 is further connected to a second one shot 154, e.g. a pair of coupled 74LS221's, for producing a pulse of predetermined amplitude and duration. The first one shot 152 produces a pulse of the appropriate amplitude to actuate FET switches 104 and 108. The pulse from the one shot 152 is of the appropriate timing and duration that FET switches 104 and 108 are open during each horizontal sweep of the television camera C and closed during at least a part of the retrace. One shot 154 produces a pulse of the appropriate amplitude to operate FET switch 142. The pulse produced by one shot 154 has the appropriate timing and duration to close FET switch 142 during at least a part of the retrace period between each horizontal scan line of the television camera C. The offset signal of the integrator 144 is adjusted when FET switch 142 is closed.

With reference to FIG. 3, a suitable image processor is disclosed in copending application Ser. No. 138,400, to Robert H. McCarthy which was filed Apr. 8, 1980 and entitled "Dynamic Image Enhancement Method and Apparatus Therefore" and which is assigned to the assignee of the present application. The image processor E comprises an analog to digital converter 200 which receives the processed or logarithmically compressed gray scale portion of the video signal. The analog to digital converter 200 converts the logarithmically compressed analog gray scale signal to a digital representation. Alternately, the analog to digital conversion can be performed in the signal processor D. This would enable the integrating, offset signal addition, or other functions of signal processor D to be performed digitally. The digitized gray scale values of the digitized video signal from a first video frame generated by the television camera C are stored in a first memory 210. The first memory 210 in the preferred embodiment, is a 256×256 pixel array with 8 bits of resolution. Each of the 256 scan lines in one frame is divided into 256 values for storage in one row of the first memory 210. Each of the 256 rows of memory 210 stores one of the 256 scan lines generated by one television frame. One television frame may be considered an image and displayed on the video monitor F to produce a display. However, in the preferred embodiment, each image is a composite of two or more video frames. A second video frame is received by the image processor E and digitized by the analog to digital converter 200. An arithmetic logic unit 212 combines each byte of digital data from the analog to digital converter 200 with the corresponding stored byte of data from the first memory 210. In the preferred embodiment, the arithmetic logic unit 212 adds the newly received value of the second or subsequent frame with the corresponding stored value of the first frame or image. This sum is returned to the corresponding pixel first memory 210. However, the sum may in some circumstances exceed the 8 byte depth which memory 210 is able to store. Accordingly, the digital signal is divided in half by a shift means 214 which drops the least significant bit. In this manner, the arithmetic logic unit 212 and shift means 214 average two video frames to produce one composite image. Analogously, three or more frames may be averaged to produce the composite image. In the preferred embodiment, the first composite image is termed a composite mask or precontrast image. This image is taken of the area or region of interest of the patient, before an x-ray opaque contrast agent is introduced into the region of interest.

The invention is not restricted to the use of the image processor of FIG. 3. Other image processors, such as the digital image processor shown in FIGS. 1 and 2 of U.S. Pat. No. 4,204,225 issued May 20, 1980 to Mistretta, also could be used. Digital image processing is well known and is discussed in detail in the following books: Kenneth R. Castleman, *Digital Image Processing*, Prentice-Hall, Inc., Englewood Cliffs, New Jersey, 1979; and Andrews & Hunt, *Digital Image Restoration*, Prentice-Hall, Inc., Englewood Cliffs, New Jersey, 1977.

The patient is injected with a small amount of the x-ray opaque contrast agent. When the contrast agent has reached the area of interest, a second or post contrast image is produced. That is, the x-ray source is again actuated, an optical image is produced on the image intensifier, and the television camera converts the optical image to a second video signal. The second video signal is received by the image processor E, digitized and stored in a second memory 220. The second memory 220 is again a 256×256 pixel array with 8 bits of resolution. To enable several frames of video information to be combined to produce a composite image in the second memory 220, a second arithmetic logic unit 222 and shift means 224 are provided. The image stored in the second memory 220 taken through the x-ray opaque contrast agent is referenced as the post contrast image.

The difference in the mask image and the post contrast image, i.e., the contribution caused by the x-ray opaque contrast agent, is medically significant. Accordingly, the signal processor E is designed for subtractively combining the mask image and the post contrast image to form a differential image. Another arithmetic logic unit 230 is provided for performing the subtractive combination of the mask image with the post contrast image.

A mapping memory 232 is provided for reducing the number of gray scales from the 28 values storable in the 8 bit deep memories 210 and 220 to about 32 gray values for display on the video monitor F. The mapping memory reduces the gray shades in accordance with a predetermined function. The function is selected to divide the medically significant intensities into different ones of the about 20 gray shades which are discernable by the human eye. A timing and control means 240 is provided for coordinating with multiplexor the flow of data through the image processor E. The timing and control means includes an address generator which is triggered by the synchronization portion of the video signal to address the first and second memories in such a manner that each digitized byte of the gray scale portion of the video signal is stored in the proper pixel of the first or second memories.

Without the logarithmic compression, the amplitude of the gray scale portion would vary as 10 raised to the power of a function of the product of the density and thickness of the examined object. Whereas with the logarithmic compression, the amplitude of the gray scale portion varies directly with the function of the product of the density and thickness of the examined object. Thus subtraction without logarithmic compression produces a complex exponential function. But subtraction with logarithmic compression produces a value that varies linearly as a function of the difference in the density, specifically the difference in density multiplied by a thickness constant.

I claim:

1. A radiographic apparatus comprising:

(a) a radiation source for irradiating an examined object with penetrating radiation, such as x-radiation;

(b) means for converting penetrating radiation into a video signal, said penetrating radiation to video signal converting means being disposed to receive from said radiation source penetrating radiation which has traversed the examined object, said video signal having a gray scale portion and a synchronization portion;

(c) logarithmic transfer means for logarithmically compressing the gray scale portion of the video signal, said logarithmic transfer means being operatively connected to said radiation to video signal converting means, the logarithmic transfer means producing an output signal that includes a logarithmically compressed video signal;

(d) base line restoring means for combining an offset signal with the gray scale portion of the video signal, said base line restoring means being operatively connected with said radiation to video signal converting means; and (e) an automatic zero circuit supplied with the output signal of the logarithmic transfer means and coupled to the base line restoring means, said automatic zero circuit generating the offset signal combined with the gray scale portion of the video signal.

2. The radiographic apparatus as set forth in claim 1 further comprising trigger means for receiving the synchronization portion of said video signal, said video signal having alternating horizontal sweep portions and retrace portions, said trigger means operatively connecting said automatic zero circuit with said base line restoring means to supply the offset signal from the automatic zero circuit to the base line restoring means for combination with the gray scale portion during the horizontal sweep portion of the video signal and connecting said automatic zero circuit with said logarithmic transfer means during at least a part of the retrace portion of the video signal.

3. The radiographic apparatus as set forth in claim 2 wherein said automatic zero circuit comprises integrating means for integrating the logarithmically compressed gray scale portion from the logarithmic transfer means during at least a portion of the retrace portion of the video signal to determine said offset signal, such that the offset signal is determined by integrating the gray scale portion during the retrace portion.

4. The apparatus as set forth in either of claims 1 and 3 wherein said logarithmic transfer means comprises a first logarithmic amplifier means for amplifying the gray scale portion with a plurality of seven and one half decibel incremented stages.

5. The radiographic apparatus as set forth in claim 4 wherein said logarithmic transfer means further comprises:

(a) means for amplifying the received gray scale portion by a multiple of seven and one half decibels; and (b) second logarithmic amplifier means for amplifying the gray scale portion with a plurality of seven and one half decibel incremented stages.

6. The radiographic apparatus as set forth in claim 5 wherein said logarithmic transfer means further comprises summing means for summing the outputs of said first and second logarithmic amplifier means such that the sum of the logarithmic signals has logarithmic conformity with the received gray scale portion of the video signal.

7. In an apparatus for performing dynamic image enhancement of a portion of a subject into which a contrast agent is introduced during a diagnostic procedure, which apparatus comprises video signal generating means for successively generating a video signal of x-ray shadowgraph images of the subject, analog to digital conversion means for converting the video signal from the video signal generating means into a digitized video signal, a first memory for storing a first digitized image, said first memory means being operatively connected with said analog to digital converting means, a second memory for storing a second digitized image of the subject and introduced contrast agent, said second memory being operatively connected with said analog to digital conversion means, and means for subtractively combining said first digital image from said first memory with said second digital image from said second memory to produce a digitized differential image, the improvement comprising:

(a) a logarithmic transfer means operatively connected with said video signal generating means and said analog to digital converter for logarithmically compressing the video signal such that the differential image produced by the subtractive combination of the digitized images generally represents the difference in the density of the first and second images multiplied by a thickness related constant.

8. The apparatus as set forth in claim 7 wherein said improvement further comprises a base line restoring means for combining said video signal with an offset signal, said base line restoring means being operatively connected with said video signal generating means and a circuit for supplying the offset signal to said base line restoring means, said circuit being operatively connected with said base line restoring means.

9. The apparatus as set forth in claim 8 wherein said circuit comprises integrating means for integrating the logarithmically compressed video signal during at least a part of a retrace portion of the video signal to determine the magnitude of said offset signal, said integrating means being operatively connected with said logarithmic transfer means.

10. A radiographic diagnostic apparatus for producing video displays of shadowgraphic images of x-ray projection through an examined region of a patient, the apparatus comprising:

(a) an x-ray source;

(b) an image intensifier for converting the received x-rays into optical shadowgraphic images, the image intensifier being disposed to receive x-rays from the x-ray source, the x-ray source and image intensifier being adapted to have the examined region of the patient disposed therebetween;

(c) a television camera for converting the optical images from said image intensifier to video signals;

(d) base line restoring means for combining said video signals with an offset signal, said base line restoring means being operatively connected to said television camera;

(e) logarithmic transfer means for logarithmically compressing the video signals, said logarithmic transfer means being operatively connected with said base line restoring means;

(f) a circuit for determining the offset signal as a function of the logarithmically compressed video signals during at least a part of a retrace portion of the video signal, said circuit being operatively connected with logarithmic transfer means and with said base line restoring means;

(g) image processing means for processing the logarithmically compressed video signals to enhance the shadowgraphic images, said image processing means being operatively connected with said logarithmic transfer means; and (h) a video monitor for displaying said shadowgraphic images, said video monitor being operatively connected with said image processing means.

11. A method for enhancing a video image display of an x-ray shadowgraph of a patient in a radiographic apparatus, the method comprising:

(a) generating a first analog video signal of a first shadowgraphic image of an x-ray shadowgraphic projection through a first region of the patient;

(b) logarithmically compressing said first video signal;

(c) digitizing said first video signal; and (d) storing said first digitized video signal in a first digital memory for subsequent display of the shadowgraphic image.

12. The method as set forth in claim 11 further comprising the steps of:

(a) injecting the patient with an x-ray opaque contrast agent;

(b) generating a second analog video signal of a second shadowgraphic image of an x-ray shadowgraphic projection through said first region of the patient and said injected x-ray opaque contrast agent;

(c) logarithmically compressing said second video signal;

(d) digitizing said second video signal;

(e) storing said second digitized video signal in a second digital memory for subsequent display of the second shadowgraphic image;

(f) subtractively combining said digitized and stored first and second video signals from the first and second memories to produce a differential video signal which represents the difference of the first and second shadowgraphic images; and (g) converting said differential video signal to a display of the difference of the first and second shadowgraphic images.

13. The method as set forth in claim 12 further comprising the step of adding an offset signal to said first and second video signals before the step of logarithmically compressing each of the first and second video signals.

* * * * *